(12) United States Patent
Eisner

(10) Patent No.: US 6,310,958 B1
(45) Date of Patent: Oct. 30, 2001

(54) SOUND-PRODUCING ARRANGEMENT FOR A MOTOR VEHICLE

(75) Inventor: Viktor Eisner, Meine (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/425,412

(22) Filed: Oct. 25, 1999

Related U.S. Application Data

(63) Continuation of application No. PCT/EP98/01846, filed on Mar. 30, 1998.

(30) Foreign Application Priority Data

Apr. 24, 1997 (DE) .............................................. 197 17 278

(51) Int. Cl.⁷ .................................................. H04B 1/00
(52) U.S. Cl. ............................................ 381/86; 181/141
(58) Field of Search ................................ 381/86, 71.5, 77, 381/82; 181/141, 150

(56) References Cited

U.S. PATENT DOCUMENTS

| | | | |
|---|---|---|---|
| 5,170,435 | * 12/1992 | Rosen et al. | 381/86 |
| 5,218,175 | 6/1993 | Scarlatta . | |
| 5,397,866 | 3/1995 | Lyons et al. . | |
| 5,822,439 | * 10/1998 | Sakiyama et al. | 381/71.5 |

FOREIGN PATENT DOCUMENTS

| | | |
|---|---|---|
| 3317518 | 11/1984 | (DE) . |
| 0712758 | 5/1996 | (EP) . |
| 4334636 | 11/1992 | (JP) . |

* cited by examiner

*Primary Examiner*—Minsun Oh Harvey
(74) *Attorney, Agent, or Firm*—Baker Botts LLP

(57) ABSTRACT

A sound producing arrangement in an automobile has at least one bass speaker and one hollow acoustic conductor coupled to the bass speaker. The bass speaker is located in the wet area of the automobile. The acoustic conductor is mounted in a gas-tight manner in the dry area and there is a gas-tight connection between the bass speaker and the acoustic conductor.

12 Claims, 1 Drawing Sheet

SOUND-PRODUCING ARRANGEMENT FOR A MOTOR VEHICLE

REFERENCE TO RELATED APPLICATION

This is a continuation of copending International application No. PCT/EP98/01846 filed Mar. 30, 1998.

BACKGROUND OF THE INVENTION

This invention relates to a sound-producing arrangement for motor vehicles having a bass speaker and a hollow acoustic conductor connected to the bass speaker.

It has long been sought to make optimum use of the existing space in a motor vehicle to increase the comfort or convenience of the motor vehicle. To this end, various efforts have been undertaken to design components more compactly or, if possible, to move them into regions of the vehicle in which the structural design provides available space.

Thus, it has been proposed that the bulky bass speaker in a sound producing arrangement be located outside the passenger compartment. The structural modification required for this is disclosed, for example, in German Offenlegungsschrfit No. 33 17 518 in which the bass speaker has an opening to which an acoustic conductor in the form of a pipe is coupled. The sound waves generated in the speaker can be directionally conducted to by this pipe to a remote location. To increase the usable space in the passenger compartment, it has therefore been proposed that the speaker be arranged in another dry area of the vehicle, where the electrical lines of the speaker are protected against troublesome moisture. Such an arrangement is disclosed, for example, in U.S. Pat. No. 5,218,175 in which an acoustic sound generating member is located in the vehicle trunk and an acoustic conductor through which sound is conducted into the passenger compartment is provided between the vehicle seat and the vehicle frame. One disadvantage of this proposed arrangement it is that the usable space gained in the passenger compartment is obtained at the expense of usable space in another dry area such as, for example, the trunk. Since the loading volume of the trunk is also a measure of the comfort or convenience of a motor vehicle, moving the speaker out of the passenger compartment into another dry area only results in a displacement and not in an increase in the comfort or convenience of the vehicle.

SUMMARY OF THE INVENTION

Accordingly, it is an object of the present invention to provide a sound producing arrangement for a motor vehicle which overcomes disadvantages of the prior art.

Another object of the invention is to provide a sound-producing arrangement for a motor vehicle in which the existing vehicle space is used in an improved way to increase vehicle comfort and convenience.

These and other objects of the invention are attained by locating a bass speaker in a wet area of the vehicle and providing an acoustic conductor between the bass speaker and the dry area of the vehicle which is mounted in gas-tight relation to the dry area of the vehicle thereby increasing the overall available space in the dry area, i.e., passenger compartment and trunk. The resulting increase in vehicle comfort and convenience is produced either directly by an increase in the freedom of movement in the passenger compartment or by the ability to use the added available space for additional convenience-enhancing components.

In a preferred embodiment, the electrical lines for each speaker are mounted in the acoustic conductor to protect them from spray and atmospheric moisture, the lines preferably being fastened to the inner walls of the acoustic conductor.

Depending upon the frequency to which the bass speakers are tuned, the acoustic conductors preferably have a length of about 0.2 m to about 0.5 m. In addition, one or more of the amplifiers for the bass speaker or speakers may be mounted in water and gas-tight sealed relation directly on the speaker or speakers, the electrical contacts to the amplifier being located inside the speaker. If the amplifier includes a cooling component such as a portion with fins it is preferably directed into the wet area of the vehicle so that heat generated by the amplifier can be effectively dissipated.

In an especially advantageous arrangement, the bass speaker is located in a bumper for the vehicle since vehicle bumpers have a relatively large unused volume. Alternatively it may be mounted in the engine compartment.

BRIEF DESCRIPTION OF THE DRAWINGS

Further objects and advantages of the invention will be apparent from a reading of the following description in conjunction with the accompanying single drawing FIGURE, designated FIG. 1, which is a schematic partial top view illustrating a representative embodiment of a motor vehicle sound producing arrangement in accordance with the invention.

DESCRIPTION OF PREFERRED EMBODIMENTS

Figure 1:
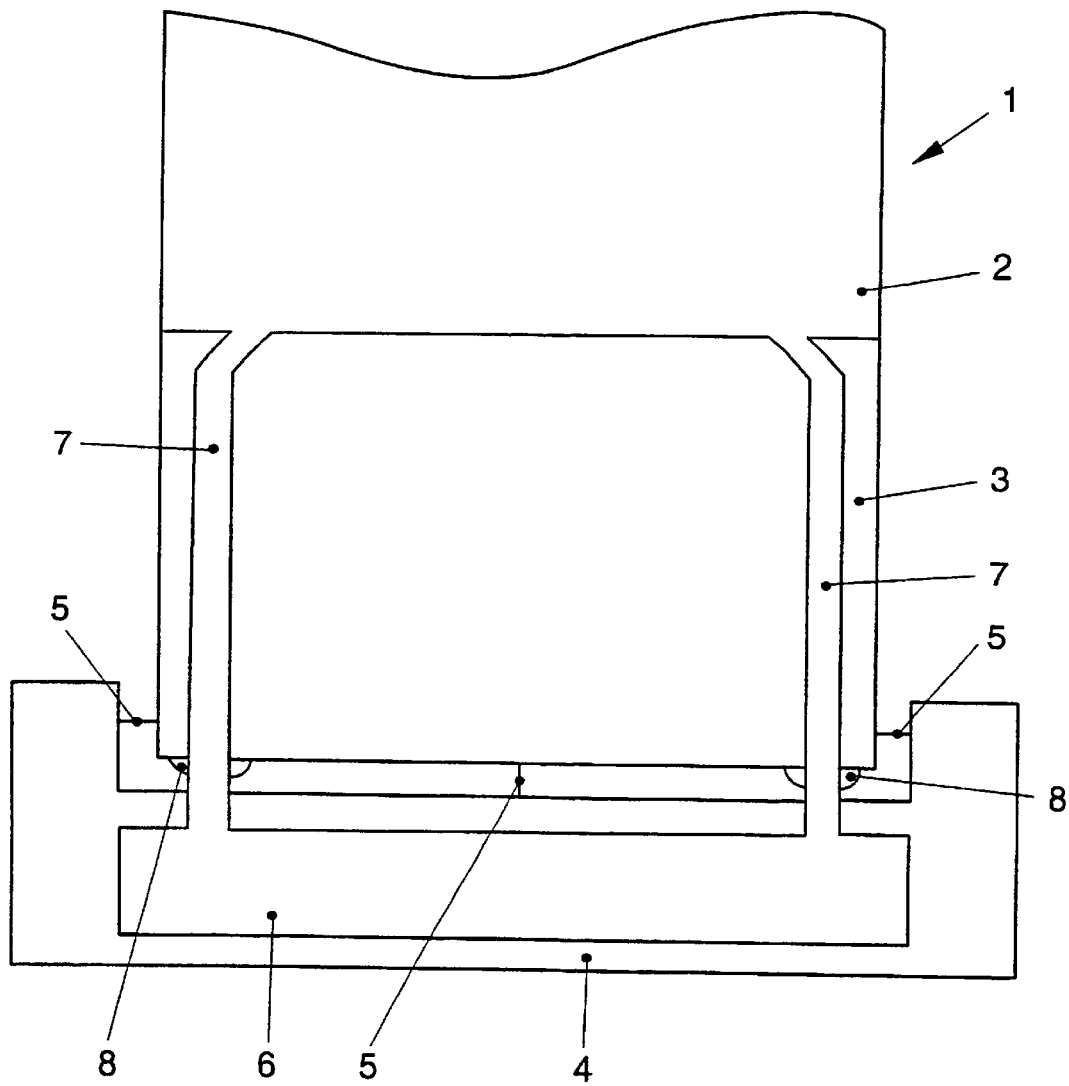

In the typical embodiment of the invention shown in FIG. 1, a motor vehicle 1 includes a passenger compartment 2, a trunk 3, and a bumper 4 which is removably mounted by fastening devices 5 to the body of the vehicle 1. A bass speaker 6 is mounted in the bumper 4 and two acoustic conductors 7, which are in the form of pipes, extend from the speaker to the passenger compartment 2. The coupling between the speaker 6 and each of the associated acoustic conductors 7 is a gas-tight seal.

The acoustic conductors 7 extend through openings in the trunk 3 or, if necessary, pass directly into the passenger compartment, and the openings are closed off by gas-tight seals 8 or suitable sealing adhesive so that no moisture or exhaust gases can enter the trunk 3. In the illustrated embodiment, the acoustic conductors 7 extend along the side walls of the trunk 3 to the passenger compartment 2 where they open into the passenger compartment in such a way that the sound has as large a free space as possible available for diffusion. Preferably the acoustic conductors open into the corners of the passenger compartment and ends of the acoustic conductors 7 are advantageously oriented diagonally toward the passenger compartment. Since the bass speakers 6 themselves are designed to be hermetically sealed, the gas-tight coupling with the acoustic conductors 7 and the gas-tight introduction of the conductors into the dry area of the vehicle clearly increases the effective volume of sound produced by the speakers. In the illustrated example, however, the available loading space in the trunk 3 is reduced by the space occupied by the acoustic conductors 7. If sound can be diffused from the trunk into the passenger compartment, such as for example in a station wagon, the sound may be discharged from the speaker directly into the trunk and the acoustic conductors 7 extending through the trunk may be omitted. In this case the acoustic conductors 7 may extend only outside the trunk 3 so as to cause the sound to be brought directly into the passenger compartment 2.

The connections between the bumper 4 and the fastening devices 5, as well as the connection between the speaker 6 and the bumper 4, are designed to be detachable so that, in case of any damage to the bumper 4, only the bumper needs to be replaced. The gas-tight coupling between the speakers 6 and the acoustic conductors 7 may likewise be designed to be detachable. To save weight, the bass speaker 6 may be designed so that it uses the existing walls of the bumper as its housing walls. As an alternative, the bass speaker may be mounted in another wet area such as the engine compartment for the vehicle.

Although the invention has been described herein with reference to specific embodiments, many modifications and variations therein will readily occur to those skilled in the art. Accordingly, all such variations and modifications are included within the intended scope of the invention.

I claim:

1. A motor vehicle having a sound-producing arrangement comprising:
    a motor vehicle having an enclosed dry area including a passenger compartment and a wet area outside the dry area;
    at least one bass speaker in the wet area of the motor vehicle; and
    at least one hollow acoustic conductor coupled in gas-tight sealed relation to the bass speaker and coupled in gas-tight sealed relation to the dry area of the motor vehicle.

2. A motor vehicle having a sound-producing arrangement according to claim 1 including electrical lines connected to the bass speaker and extending within the acoustic conductor.

3. A motor vehicle having a sound-producing arrangement according to claim 2 wherein the electrical lines are mounted on inner walls of the acoustic conductor.

4. A motor vehicle having a sound-producing arrangement according to claim 1 wherein the acoustic conductor comprises a pipe.

5. A motor vehicle having a sound-producing arrangement according to claim 1 wherein an end of the acoustic conductor extends diagonally into the passenger compartment.

6. A motor vehicle having a sound-producing arrangement according to claim 1 wherein the acoustic conductor has a length in the range from about 0.2 m to about 0.5 m.

7. A motor vehicle having a sound-producing arrangement according to claim 1 wherein an amplifier for the bass speaker is mounted in sealed relation on the bass speaker and has electrical contacts located in the bass speaker.

8. A motor vehicle having a sound-producing arrangement according to claim 7 including cooling fins for the amplifier directed into the wet area of the vehicle.

9. A motor vehicle having a sound-producing arrangement comprising:
    a motor vehicle having a dry area including a passenger compartment and a wet area:
    at least one bass speaker in the wet area of the motor vehicle: and
    at least one hollow acoustic conductor coupled in gas-tight sealed relation to the bass speaker and coupled in gas-tight sealed relation to the dry area of the motor vehicle wherein the bass speaker is mounted in a bumper for the vehicle.

10. A motor vehicle having a sound-producing arrangement comprising:
    a motor vehicle having a dry area including a passenger compartment and a wet area;
    at least one bass speaker in the wet area of the motor vehicle, and
    at least one hollow acoustic conductor coupled in gas-tight sealed relation to the bass speaker and coupled in gas-tight sealed relation to the dry area of the motor vehicle wherein the bass speaker is arranged in an engine compartment of the vehicle.

11. A motor vehicle having a sound-producing arrangement according to claim 1 wherein the walls of a component located in the wet area of the vehicle serve as walls of the bass speaker.

12. A bumper for a motor vehicle comprising a bumper structure containing at least one bass speaker and an acoustic conductor for conducting sound from the bass speaker to a location outside the bumper structure.

* * * * *